(12) United States Patent
Randleman

(10) Patent No.: US 11,897,448 B2
(45) Date of Patent: Feb. 13, 2024

(54) SYSTEMS, METHODS, AND APPARATUSES FOR MACHINE CONTROL AT WORKSITE BASED ON NOISE LEVEL

(71) Applicant: Caterpillar Inc., Peoria, IL (US)

(72) Inventor: Sean A. Randleman, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 399 days.

(21) Appl. No.: 17/124,699

(22) Filed: Dec. 17, 2020

(65) Prior Publication Data

US 2022/0195699 A1  Jun. 23, 2022

(51) Int. Cl.
*B60W 20/17* (2016.01)
*B60W 30/182* (2020.01)

(52) U.S. Cl.
CPC .......... *B60W 20/17* (2016.01); *B60W 30/182* (2013.01); *B60W 2300/125* (2013.01); *B60W 2300/17* (2013.01)

(58) Field of Classification Search
CPC ............. B60W 20/17; B60W 2300/17; B60W 2300/125
See application file for complete search history.

(56) References Cited

U.S. PATENT DOCUMENTS

| | | | |
|---|---|---|---|
| 6,839,625 B2 | 1/2005 | Kunzeman et al. | |
| 9,134,721 B2 | 9/2015 | Koehrsen et al. | |
| 2002/0065607 A1* | 5/2002 | Kunzeman | G01C 21/26 701/50 |
| 2002/0072963 A1* | 6/2002 | Jonge | G08G 1/01 705/13 |
| 2003/0229434 A1* | 12/2003 | Miedema | A01B 79/005 701/50 |
| 2006/0173593 A1* | 8/2006 | Anderson | F02N 11/0833 701/1 |
| 2013/0268138 A1 | 10/2013 | Moughler et al. | |
| 2013/0311147 A1 | 11/2013 | Greenwood | |
| 2017/0122741 A1* | 5/2017 | Sakai | G01C 21/005 |
| 2017/0286886 A1 | 10/2017 | Halepatali et al. | |
| 2019/0024342 A1* | 1/2019 | Yoshida | B60W 20/17 |
| 2020/0162559 A1 | 5/2020 | Sustaeta et al. | |
| 2020/0380628 A1* | 12/2020 | Futakami | G06Q 10/06313 |
| 2021/0149391 A1* | 5/2021 | Ready-Campbell | G05D 1/0289 |

* cited by examiner

*Primary Examiner* — Amelia Vorce

(57) ABSTRACT

A system, method, and apparatus can provide control signaling to control one or more autonomous machines during a plurality of predefined periods of time. Each of the one or more autonomous machines can be controlled according to a maximized productivity level for each task performed by the autonomous machine while at the same time generating sound during performance of the task at the maximized productivity level no louder than respective maximum noise limit levels specific for the plurality of predefined periods of time.

14 Claims, 3 Drawing Sheets

SYSTEMS, METHODS, AND APPARATUSES FOR MACHINE CONTROL AT WORKSITE BASED ON NOISE LEVEL

TECHNICAL FIELD

The present disclosure relates to machine control, and more particularly to systems, methods, and apparatuses to control one or more machines based on noise level.

BACKGROUND

Noise restrictions, whether governmentally promulgated or otherwise, can be applicable to a site or sites (e.g., at a worksite). The noise restrictions can be day-specific, meaning the noise restrictions may change depending upon the time of day, day of the week, and/or day of the year. For instance, maximum noise level limits for a site may be lower at night or on the weekend compared to traditional working hours during the week. Such noise restrictions may limit the ability to operate one or more machines at the sites. For instance, one or more of the machines and in some cases all of the machines may be stopped from operating during the heightened noise restriction time periods. This can lead to decreased productivity at the site.

U.S. Pat. No. 6,839,625 ("the '625 patent") describes an apparatus and method for reducing work machine noise based on location. The '625 patent describes placing a work machine in a normal mode of operation if a desired noise level associated with the position of the work machine exceeds a threshold noise level and placing the work machine in a reduced noise mode of operation if the desired noise level falls below the threshold noise level. The '625 patent also describes that during the day the desired noise level is set to a relatively high level, whereas during the night, the desired noise level can be set to a relatively low level.

SUMMARY

According to an aspect a non-transitory computer-readable storage medium having stored thereon instructions that, when executed by one or more processors, cause the one or more processors to perform a method is disclosed or provided. The method can comprise providing control signaling to control one or more autonomous machines during a plurality of predefined periods of time; and responsive to said providing the control signaling, controlling each of the one or more autonomous machines according to a maximized productivity level for each task performed by the autonomous machine while at the same time generating sound during performance of the task at the maximized productivity level no louder than respective maximum noise limit levels specific for the plurality of predefined periods of time.

In another aspect, a method for enforcing noise level limits at a worksite is disclosed or implemented. The method can comprise accessing, in electronic memory, time-specific maximum noise limit data specific to the worksite, the time-specific maximum noise limit data including maximum noise limit levels for different periods of time for the worksite; providing, using one or more electronic processors, control signaling to control a plurality of autonomous working machines at the worksite during a continuous work period; and in response to said providing the control signaling, and depending upon whether in a first period of time or a second period of said different periods of time, either controlling each of the autonomous working machines in a first noise-optimized mode according to first defined machine operation parameters previously identified to yield different sound characteristics no louder than a first maximum noise limit level of said maximum noise limit levels, or controlling each of the autonomous working machines in a second noise-optimized mode according to second defined machine operation parameters previously identified to yield different sound characteristics no louder than a second maximum noise limit level of said maximum noise limit levels. For each said autonomous working machine, maximum productivity and sound output levels in the first noise-optimized mode can be greater than maximum productivity and sound output levels in the second first noise-optimized mode.

And in another aspect a system for controlling a plurality of mobile autonomous machines at a worksite is disclosed or provided. The system can comprise non-transitory computer-readable memory to store time-specific maximum noise limit data specific to the worksite, the time-specific maximum noise limit data including maximum noise limit levels for different periods of time for the worksite; and control circuitry operatively coupled to the non-transitory computer-readable memory. The control circuitry can be configured to set a continuous work period for the mobile autonomous machines at the worksite; when the continuous work period is in a first period of time of said different periods of time, control each of the mobile autonomous machines at all times in a first noise-optimized mode according to a first plurality of different sets of defined machine operation parameters each previously identified to yield different sound characteristics no louder than a first maximum noise limit level of said maximum noise limit levels stored in the non-transitory computer-readable memory, where each of the different sets of defined machine operation parameters of the first plurality can correspond to respective operational tasks performed by the mobile autonomous machine; and when the continuous work period is in a second period of time that is non-overlapping with the first time period of said different periods of time, control each of the mobile autonomous machines at all times in a second noise-optimized mode according to a second plurality of different sets of defined machine operation parameters each previously identified to yield different sound characteristics no louder than the second maximum noise limit level of said maximum noise limit levels stored in the non-transitory computer-readable memory, where each of the different sets of defined machine operation parameters of the second plurality can correspond to respective operational tasks performed by the mobile autonomous machine. For each said mobile autonomous machine, maximum productivity and sound output levels in the first noise-optimized mode can be greater than maximum productivity and sound output levels in the second noise-optimized mode.

Other features and aspects of this disclosure will be apparent from the following description and the accompanying drawings.

DETAILED DESCRIPTION

The present disclosure relates to machine control, and more particularly to systems, methods, and apparatuses to control one or more machines based on noise level.

Figure 1:
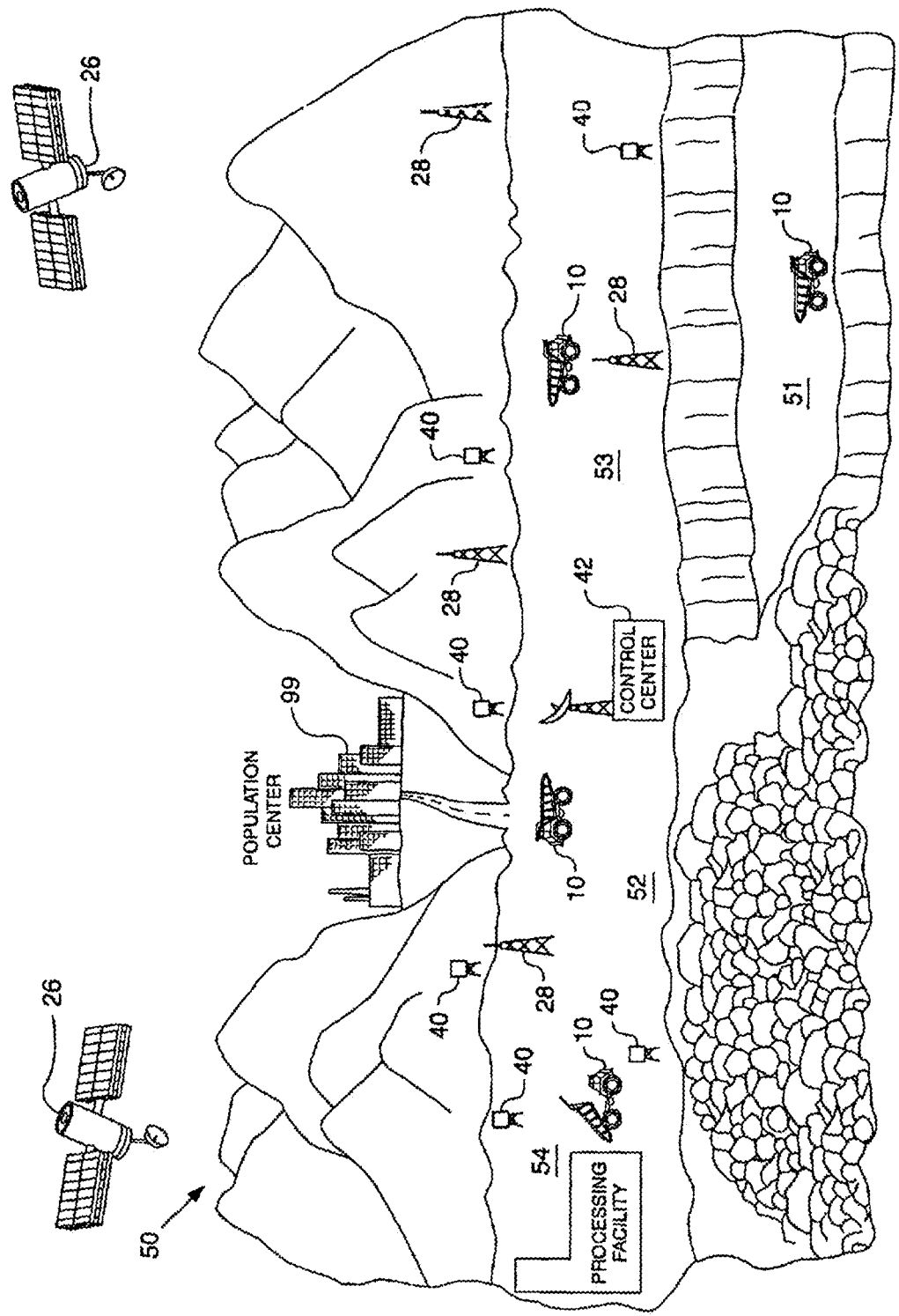
FIG. 1 shows an exemplary environment in which systems, methods, and apparatuses according to one or more embodiments of the disclosed subject matter can be implemented.

Referring now to FIG. 1, FIG. 1 shows exemplary environment in which systems, methods, and apparatuses according to one or more embodiments of the disclosed subject matter can be implemented. The environment can be referred to as a site 50, which may correspond to one or more sites within the overall site 50. In the case of multiple sites, the sites may be contiguous or non-contiguous, for instance, separated by geography and/or a structure (e.g., a road) that may not be considered part of the site 50.

According to one or more embodiments, the site 50 may be a worksite or a plurality of worksites. The site 50 in the form of a worksite (or worksites) may pertain to mining, infrastructure, building construction, etc. For instance, the site 50 in FIG. 1 can have a pit site 51, a cut site 52, a transit site 53, and a processing site 54. Depending upon the work to be performed at the site 50, one or more of the sites may be referred to as a filling site, a dumping site, a hauling site, etc. One or more roads to a population center 99 may or may not be part of the site 50. Of course, embodiments of the disclosed subject matter are not limited to the site characterizations above and may include any site associated with a worksite or a non-worksite.

One or more machines 10 can be provided at the site 50. Each of the machines 10 can be an autonomous machine, either fully autonomous (i.e., unmanned) or semi-autonomous. In the case of multiple machines 10, optionally, the machines 10 may be a mix of fully autonomous and semi-autonomous machines 10. The site 50 can include geofencing, light curtains, and/or integrated machine sensors, particularly in the case of autonomous machines 10 operating within the site 50.

Generally, embodiments of the disclosed subject matter can involve operating the one or more machines 10 continuously throughout extended periods of time (e.g., a day, multiple consecutive days, a week, a month). Such continuous operating periods may be referred to as continuous work periods. Thus, sites 50 according to embodiments of the disclosed subject matter may be referred to or characterized as continuous sites (e.g., continuous worksites).

Some or all of the site 50 can have associated therewith noise requirements. That is, sound generated at the site 50, including sound generated by operation of the machines 10, can be subject to restrictions. The noise restrictions can be specific to the site 50, including specific to the project(s) to be performed at the site 50 and/or the type(s) of machines 10 at the site 50. Optionally, the noise restrictions can include operator noise restrictions (in the case of semi-autonomous operation involving local operators for one or more of the machines 10).

The noise restrictions can include maximum noise limit levels (e.g., amplitude, duration, frequency, etc.) specific to the site 50. Notably, different noise restrictions may be applicable at the site 50 for different periods of time. In this context, different periods of time can include different times of a day (e.g., day or night, 9-5 work day), different days of a week (e.g., weekday or weekend), and/or different days of a year (e.g., a holiday). For instance, a maximum noise limit level specific to the site 50 may be greater during the day than a maximum noise limit level specific to the site 50 during the night. Thus, the machines 10 at the site 50 can be subject to different noise restrictions depending upon the particular time within a work period. That is, the site 50 may be subject to different noise restrictions (including no noise restrictions) throughout the course of a day, different days of the week, and/or different days of the year. In this regard, one continuous work period at the site 50 can, over the continuous work period, be subject to multiple different noise restrictions.

In the example of FIG. 1, the machines 10 are working machines 10 in the form of off-highway trucks (e.g., rear haul trucks). However, machines 10 according to embodiments are not limited to off-highway trucks and may alternatively or additionally include other types of working machines, such as one or more of each of a track-type tractor, a loader (e.g., skid steer), a front shovel, an excavator, a drilling machine, a trencher, or some other type of earthmoving machine. That is, the machines 10 at the site 50 may be different types of machines 10. Note, however, that the site 50 may include earth-moving portions and/or non-earth-moving portions. Thus, machines 10 according to embodiments of the disclosed subject matter can include earth-moving and non-earth moving machines, working and non-working machines, and mobile and stationary machines within the site 50.

The machines 10 at the site 50 can be in communication with a control center 42 via one or more wireless networks. Optionally, some or all of the machines 10 can be in communication with each other in addition to being in communication with the control center 42. Though FIG. 1 shows the control center 42 being at the site 50, the control center 42, or portions thereof, may be offsite from the site 50. For example, the control center 42 may be a back office system located remote from the site 50. The machines 10 may have a receiver 32, which may be a transceiver, to communicate with the control center 42 and/or one or more other machines 10.

Figure 2:
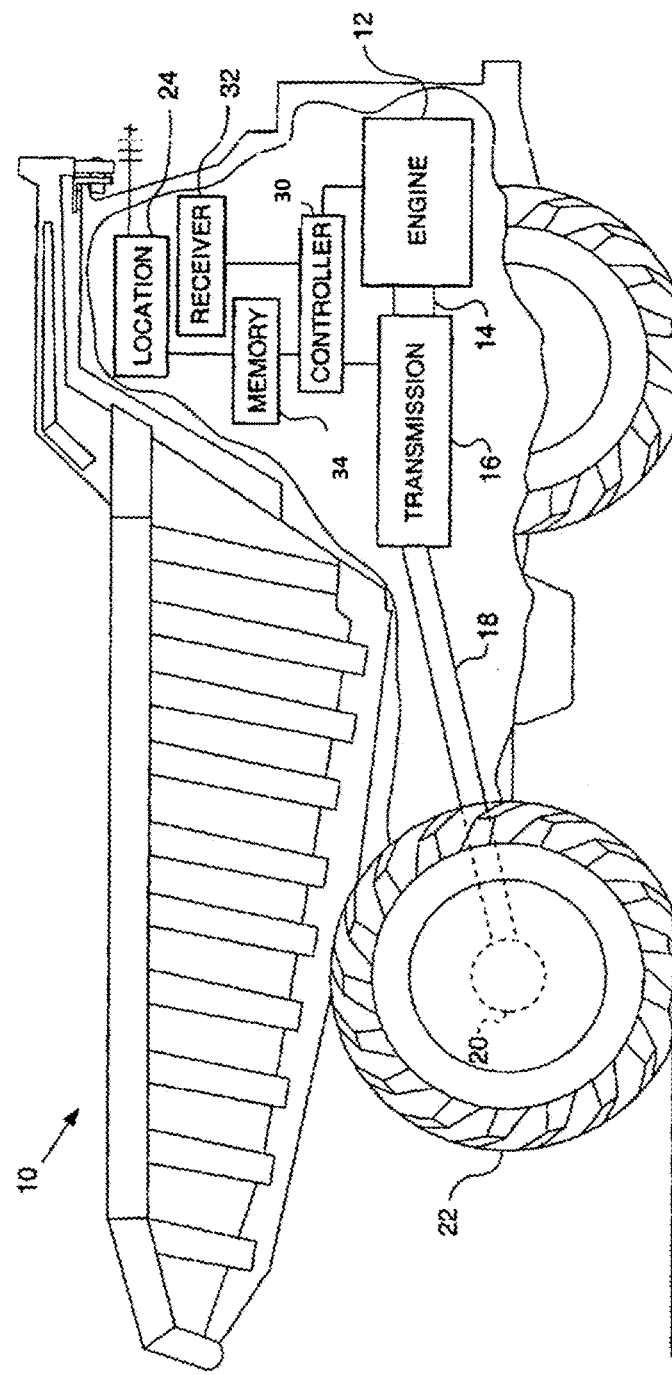
FIG. 2 is a diagram of an exemplary machine according to one or more embodiments of the disclosed subject matter.

FIG. 2 is a diagram of one of the machines 10 shown in FIG. 1. FIG. 2 can be representative of some or all of the machines 10 shown in FIG. 1. As noted above, the machines 10 may be of the same type or different types.

Generally, the machine 10 can include an engine 12 (e.g., an internal combustion engine) to drive a transmission input shaft 14 which in turn can drive the transmission 16. The transmission 16 can be operable to select different gear ratios between the transmission input shaft 14 and a transmission output shaft 18. The transmission output shaft 18 can further drive a final drive 20, which in turn can drive wheels 22 to propel the machine 10 about the site 50. Optionally, the machine 10 may be an electric machine 10, either fully electric or hybrid with the engine 12.

The machine 10 can include a control unit or controller 30 and memory 34. At least the controller 30 may be implemented in or using control circuitry. The memory 34, which may also be considered part of the control circuitry, can be non-transitory computer-readable memory that stores time-specific noise restriction data (e.g., maximum noise limit data) specific to the site 50. That is, the memory 34 can store noise restrictions specific to the site 50 for different periods of time as noted above. The controller 30 can be operatively coupled to the memory 34 to access the noise restriction data stored in the memory 34. According to one or more embodiments, the memory 34 can receive the noise restriction data from the control center 42 or from another one of the machines 10. In this regard, the noise restriction data can be updated, as needed, either at each of the machines 10 or at the control center 42 prior to sending to the machines 10.

Generally, the controller 30 can control operation of the machine 10 for the machine 10 to perform one or more tasks at the site 50. Each of the tasks can include one or more operations performed by the machine 10. Examples of tasks can include digging, loading, hauling, dumping, drilling, etc., depending upon the type of machine 10. Examples of operations can include tilting and return of a dump bed as part of a dumping task in the case of the machine 10 being a haul truck. Of course, the foregoing are merely examples and different machines 10 can perform different tasks and corresponding operations as part of a work project.

Optionally, control signaling to control operation of the machine 10 can be provided, at least in part, by the control center 42. In this regard, control components, which may be referred to herein as control circuitry, can be localized at the machine 10, across multiple machines 10, or across the machine 10 and the control center 42. As such, control components, including the controller 30 of the machine 10, and/or memory components, including the memory 34 of the machine 10, can be considered to be distributed among the machine 10 and the control center 42. Hence, at least a portion of the memory and/or at least a portion of the control components may be remote from the machine 10, such as at the control center 42.

Operation of the machine 10 (and the other machines 10) at the site 50 can involve determination of a current time associated with the operation of the machine 10. As noted above, the current time may correspond to a time period in the form of a period of time in a day (e.g., day or night), a different day of a week (e.g., weekday or weekend), or a different day of a year (e.g., a holiday). According to one or more embodiments, each machine 10 can determine the current time individually, for instance, using a timer or clock of the controller 30. Alternatively, the control center 42 can determine the current time and send the determination to each of the machines 10. Also noted above, different noise restrictions specific to the site 50 can be associated with different time periods of a continuous work period for the site 50. Hence, the machine 10 and/or the control center 42 can determine current noise restriction, if any, applicable to the machines 10 at the site 50 for the current period of time.

Based on the period of time and the corresponding noise restriction, each machine 10 can be controlled according to a particular noise-optimized mode during the period of time. In this regard, the different periods of time (and corresponding noise restriction) for the site 50 can have associated therewith respective different noise-optimized modes. Each machine 10 or the control center 42 may initiate and continue control according to the noise-optimized mode for the associated period of time.

Generally, control of the machine 10 according to each noise-optimized mode can involve placing restrictions (including availability) on one or more operation parameters in light of the corresponding noise restriction. Such operation parameters may include or otherwise impact functionality, operations, tasks, and/or way in which the functionality, operation, or task is able to be performed subject to the noise restriction. Optionally, one or more of the machines 10 may be disabled if the machine 10 is not able to perform the necessary task(s) without violating the noise restriction.

The machine operation parameters may have been previously identified to yield sound characteristics that fall within the specific noise restriction requirements associated with the noise-optimized mode. That is, operations performed by the machine 10 for different tasks may have been previously tested using different configurations of machine operation parameters (e.g., incremental changes in operation parameters) and the generated sound characteristics for each operation measured and recorded. The operation parameters may be specific to a particular component or system of the machine 10. As such, a set of different operation parameters may be set for each component and/or system of the machine 10 associated with performing the operation or task according to the noise-optimized mode. Optionally, the capture of sound characteristics for the different machine operation parameters may include factors outside the machine 10, such as road surface material, weather, load (e.g., rocks unloaded from a dump bed may generate louder sound than sand, for instance).

Thus, the machine 10 and/or the control center 42 can know in advance sound characteristics of different operational parameters, operations, and tasks of the machine 10 whereby such prior knowledge can be associated with different noise restrictions specific to the site 50 and corresponding noise-optimized modes for operating the machine 10. Such prior information may be stored in the memory 34 of the machine 10 and/or memory of the control center 42.

Examples of operation parameters in terms of power supply(ies) of the machine 10 can include limitations on rpms of the engine 12, use (or non-use) of particular power systems of the machine 10 (e.g., switching from engine 12 to electric power), transmission settings (e.g., available gears), and/or operation of associated pumps, valves, exhaust systems, etc.

Examples of operation parameters in terms of machine movement can include different movement patterns, such as different route, work angle, etc. (for the machine 10 and/or a working tool of the machine 10), a re-sequencing of operations or tasks (e.g., relative to a non-noise-optimized mode or another noise-optimized mode), and/or a different rate of movement of the working tool of the machine 10 (e.g., excavator rotation or boom/stick speeds).

Examples of operation parameters in terms of ground engagement can include speed adjustments (e.g., reducing speed) of the machine 10 and/or use of different working tools (including ground engagement members.

Setting operation parameters for one component or system of the machine 10 may take into consideration the setting of operation parameters for another component or system of the machine 10. For instance, switching from engine 12 to electric power in light of the corresponding noise restriction may allow the machine 10 to move at a higher rate of speed. Thus, the setting of operations parameters may not necessarily lead to decreased capacity (and hence productivity). Optionally, in some cases, the operational parameters may be set such that a lowest amount of sound may be generated from the machine 10 while still achieving a desired productivity level or result.

The machine operation parameters can be set such that productivity of the machine 10 is tuned to deliver the greatest productivity (e.g., maximum productivity) for tasks and work projects performed by the machine 10 while at the same time ensuring that the operations of the machine 10 do not generate sound having characteristics outside the specific noise restriction(s) for the corresponding period of time. In any event, productivity may be adjusted (e.g., decreased) upon initialization of the particular noise-optimized mode to adjust the generated noise for that noise-optimized mode. However, the adjustment for productivity may not necessarily lead to a one-to-one ratio adjustment in terms of the sound generated by the machine 10. In any event, the operation parameters for the machine 10 can be adjusted (e.g., incremental adjustment) to decrease, increase, or maintain sound generated by each of the machines 10 such that the noise limit restrictions are not exceeded while also meeting desired productivity levels for the machine 10. The machine 10, using the controller 30, for instance, can self-set and maintain its machine operation parameters during operation thereof in the particular noise-optimized mode. Alternatively, the control center 42 can set and maintain the machine operation parameters for the machine 10 during operation of the machine 10 in the noise-optimized mode.

Here, maximum productivity may or may not necessarily mean less than 100% of the machine's 10 operational capability. Rather, the machine 10 may be able to operate at 100% productivity at least in some respects (e.g., one or more operations or tasks) but perhaps not in other respects (e.g., one or more other operations or tasks) such that sound having characteristics outside the specific noise restriction is not generated in any respect. In this regard, maximum productivity may mean maximum achievable productivity for the machine 10 (or a system thereof) or a maximum productivity set by the control center 42, for instance. Incidentally, in that autonomously operating machines 10 may be able to operate at greater productivity levels compared to the same operation(s) under human operator control, according to embodiments of the disclosed subject matter the productivity level of the machine 10 can be set greater than a typical productivity level for one or more of the operations or tasks of the machine 10 when under control of a human operator during an operator-controlled mode of the same machine 10 or a counterpart machine when the machine 10 is fully autonomous.

As an example of the foregoing, the machine 10 may perform a dumping task according to a particular noise-optimized mode for the site 50 based on the noise restriction associated with the period of time at the site 50. Here, the machine operation parameters may have been set, for instance, upon entering the particular noise-optimized mode, for the particular task, i.e., the dumping task. In this regard, operations performed by the machine 10 to accomplish the task can include an operation to tilt the dump bed to dump material from the machine 10 and an operation to tilt the dump bed back to a haul position. The operational parameters may set (preset), as noted above, such that each of the operations is performed a set productivity level while also satisfying the noise restriction requirement for the site 50 at that time. For instance, the speed by which the dump bed is tilted to can be maximized to the highest speed that does not generate sound that exceeds the noise restriction requirement (e.g., the maximum noise limit level). As noted above, the dump material in the dump bed may be a factor in the setting of the operational parameters. Indeed, the operational parameters may need to be updated based on changed external factors at the worksite 50, such as due to a change in load (e.g., different type of material), weather (e.g., rain), etc.

According to one or more embodiments, the machines 10 can be controlled according to a particular noise-optimized mode such that collective sound generated at any one time by all of the machines 10 never exceeds the noise restriction requirement. Optionally, the machines 10 can be controlled such that operations or tasks are performed in non-overlapping fashion in terms of timing. For instance, if two machines 10 each performing a separate task at the same time would generate sound outside of the noise restriction requirement, then the machines 10 may be controlled (or control themselves) to successively perform the tasks (e.g., in non-overlapping fashion) such that neither generates sound outside of the noise restriction requirement. Incidentally, operations and/or tasks may be the same or different for the machines 10. Thus, control of the machines 10 can be such that individual sounds generated during performance of operations (e.g., of a task) can be balanced whereby collective sound generated at any one time by all of the machines 10 never exceeds the noise restriction requirement(s) (e.g., maximum noise limit level). The machines 10 may communicate with each other, for instance, using their respective receivers 32, to coordinate their operations and tasks to satisfy the noise restriction requirement(s). In this regard, such communication may exclude the control center 42.

According to one or more embodiments, control of the machines 10 according to the particular noise-optimized mode can be solely based on a current time and the corresponding noise limit restrictions specific to the site 50, along with the predetermined settings for the operation parameters of the machine 10 for the particular noise-optimized mode. Thus, embodiments of the disclosed subject matter may be characterized as an open-loop control system whereby actual sound generated of the machines 10 is not known but rather estimated or predicted based on prior knowledge of sound characteristics of the operations, tasks, etc., as discussed above. Additionally or alternatively, actual sound of one or more of the machines 10 can be used to set the operation parameters of the machine 10 and/or adjust the operation parameters of the machine 10 based on the actual sound, for instance, if the actual sound generated by one or more of the machines 10 causes the generated sound to be outside the noise restriction(s).

One or more sound detection sensors can be provided at the site 50 to detect sound at the site 50. Such sound detection sensors can be provided onboard the machines 10 and/or about the site 50. For instance, one or more sound detection sensors 40 may be positioned at various locations around the site 50. The sound detection sensors 40 can measure the ambient noise at each location within the site 50 and transmit sound level information to the control center 42 and/or the machines 10. The sound level information can be used to determine whether the machines 10, operating according to the set operation parameters for the particular noise-optimized mode, indeed actually do not generate sound that exceeds the noise limit restrictions for the current time at the site 50. In the event that the actual sound generated by one or more of the machines 10 exceeds the noise limit restriction, in response, one or more of the machines 10 can be controlled, for instance, based on an incremental adjustment of one or more operation parameters, to decrease, increase, or maintain sound generated by each of the machines 10 such that the noise limit restrictions are not exceeded.

Optionally, the control of the machines 10 can involve a prediction of when one or more of the machines 10 is anticipated to generate sound that would fail to meet the noise restriction requirements. Such prediction can be based on changing conditions at the site 50, such as due to weather, ground condition, operating condition of the machine 10 (e.g., the machine 10 is malfunctioning, anticipated to malfunction, or otherwise operating outside of normal operating parameters). Based on the prediction, the control can make adjustments (e.g., incremental) to operation parameters of the machine 10 in an effort to prevent operation of the machine 10 from running afoul of the noise restriction.

Optionally, the location of each of the machines 10 can be taken into consideration when controlling the machine 10 according to the particular noise-optimized mode. For instance, the machine 10 can have a location determining device 24 to determine location of the machine 10 within the site 50. In one or more embodiments, the location determining device 24 can be a positioning system (e.g., global positioning system) that can receive signals from one or more satellites 26 and/or one or more location transponders 28 to determine location of the machine 10 within the work site 50.

Optionally, the location determining device 24 may receive position signals from one or more local transponders 28 at the site 50 that transmit respective location signals to determine the location of the machine 10 within the site 50. Such location signals can be radio frequency transmissions, but additionally or alternatively may be laser signals generated at each of the local transponders 28. As a further addition or alternative, the location determining device 24 can be an inertial system that can determine the location of the machine 10 by entering a known starting location and using changes in inertia to determine the current location of the machine 10 within the site 50 relative to the known starting position. Thus, by way of the location determining device 24, the machine 10 itself can identify its location. The location information can be sent directly from the machine 10 and/or via another machine 10 or component at the site 50, such as the control center 42. Thus, the control center 42 and optionally one or more additional machines 10 at the site 50 can know the location of each machine 10 at the site 50. The location information for the machines 10 can be applied to a map of the site 50. Thus, the control center 42 and/or each of the machines 10 can be provided with location of all of the machines 10 at the site 50, as well as other features of the site 50, such as boundaries, geography, roads, structures, subsites (e.g., worksites or zones), etc.

Sound generated by one or more of the machines 10 may be controlled based on the location of the machine 10 within the site 50. For instance, it may be necessary to reduce the sound generated by the machine 10 to satisfy the noise restriction requirements for the site 50 when the machine 10 is relatively close to a boundary of the site 50. Based on the decrease of sound from one of the machines 10, the sound generated by one or more of the other machines 10 may be maintained or even increased, so long as the sound generated by the machines 10 does not violate the current noise restriction at the site 50.

INDUSTRIAL APPLICABILITY

As noted above, the present disclosure relates to machine control, and more particularly to systems, methods, and apparatuses to control one or more machines based on noise level.

In the case of autonomous machinery, as autonomous machinery moves from mining operations to residential and commercial worksites it can be durable to extend continuous work periods (e.g., into 24-hour intervals) at the site for increased productivity and shorter overall job durations. Sensitivity to noise generated by the machine(s) at the site may be specific to particular times during the work period. Thus, it can be desirable to balance productivity in light of noise restrictions applicable to the site in order to maintain the extended work period and perform work tasks throughout the work period.

Embodiments of the disclosed subject matter can thus set machine operation parameters for the machines at the site, such as machines 10, to tune productivity such that desired (e.g., maximum) productivity can be achieved throughout the work period during a variety of allowable noise levels, for specific site conditions (including safety protocols). In this regard, operation parameters of the machine 10 can be set (or reset) throughout the work period to achieve the desired productivity for the machine 10 while also meeting varying noise restrictions throughout the work period. Thus, embodiments of the disclosed subject matter can involve the development of defined, incremental machine operation parameters that can yield different noise characteristics and that can be selectable for machine operation to meet productivity and noise restriction requirements. Each site, such as site 50, can be assessed and the machine operation parameters set for tuning before starting machine operations at the site or even on the fly during work. Noise levels could be monitored or pre calculated based on productivity levels for each machine, work type, and medium.

Figure 3:
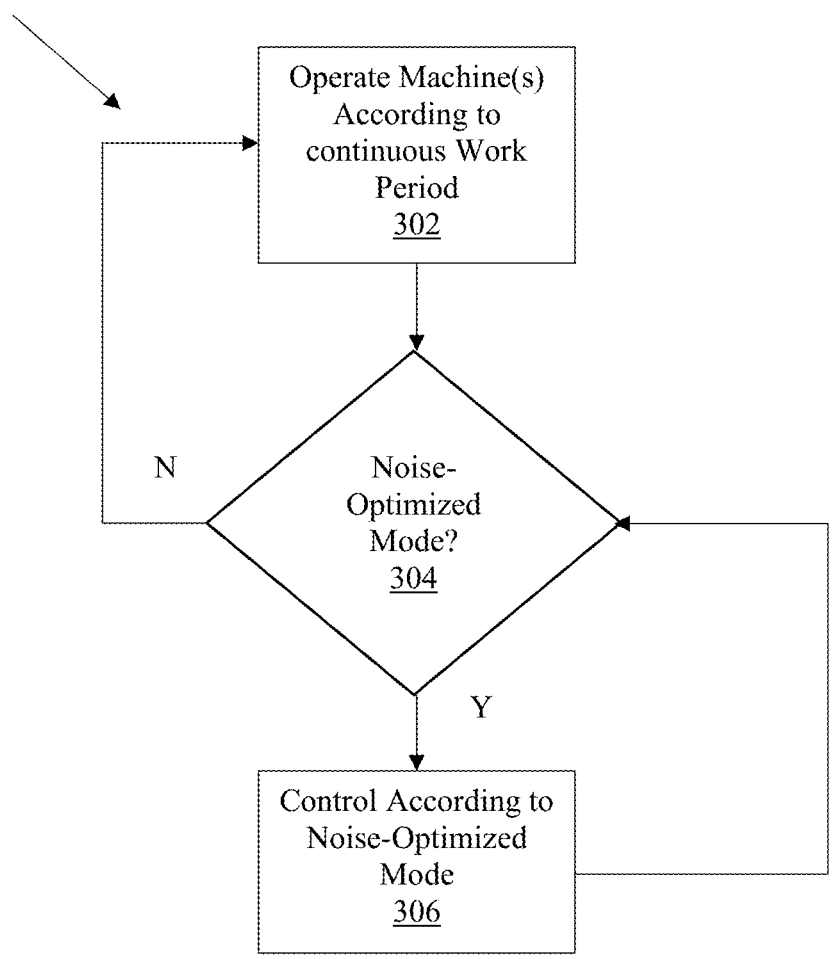
FIG. 3 is a basic flow chart of a method according to one or more embodiments of the disclosed subject matter.

Turning to FIG. 3, FIG. 3 is a basic flow chart of a method 300 according to one or more embodiments of the disclosed subject matter. Some or all of the method 300 can be performed using a non-transitory computer-readable storage medium having stored thereon instructions that, when executed by one or more processors (e.g., one or more electronic processors of the controller 30 and/or the control center 42), cause the one or more processors to perform the method 300. According to one or more embodiments, the method 300 can enforce noise restrictions (e.g., noise level limits) at a site, such as site 50. The method 300 can also enforce noise restrictions at the site 50 while also operating the machine(s) 10 at desired productivity levels in light of the noise restrictions at different times of a continuous work period or periods at the site 50.

At operation 302 the method 300 can operate one or more machines at the site 50, such as machines 10, according to a continuous work period. The continuous work period can have different time periods associated with different noise restrictions specific to the site 50, as described above.

At operation 304 the method 300 can determine whether to control one or more of the machines 10 according to a predefined noise optimized mode as described above. The determination at operation 304 regarding whether to control the one or more machines 10 according to the predefined noise optimized mode can be based on the current time period within the continuous work period and whether such current time period has an associated noise restriction. If at operation 304 it is determined that a noise-optimized mode is to be initiated for the one or more machines 10, then the method 300 can proceed to operation 306. Otherwise, the method 300 can continue to determine whether to initiate a noise optimized mode (or another noise optimized mode).

At operation 306 the method 300 can operate each of the one or more machines 10 according to the particular noise-optimized mode for the specific period of time within the continuous work period. The noise-optimized mode at operation 306 may be a transition from a non-noise-optimized mode of operation for the one or more machines 10 or from another noise-optimized mode with different noise restriction(s) relative to the current noise restriction(s). The control according to noise-optimized mode can be as described above, including to set (or adjust) machine parameters to optimize production while at the same time preventing the machine(s) 10 from generating sound at the site 50 that violates the current noise restriction(s) for the site.

Control may proceed from operation 306 to continue to check whether to control the machine(s) 10 according to a noise-optimized mode, which may include the same noise-optimized mode or a different noise-optimized mode.

As used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a server, to perform various functions); and (c) to circuits, such as a microprocessor(s) or a portion of a microprocessor(s), that require software or firmware for operation, even if the software or firmware is not physically present.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A system for controlling a plurality of mobile autonomous machines at a worksite comprising:
    non-transitory computer-readable memory to store time-specific maximum noise limit data specific to the worksite, the time-specific maximum noise limit data including maximum noise limit levels for different periods of time for the worksite; and
    control circuitry operatively coupled to the non-transitory computer-readable memory, the control circuitry being configured to
    set a continuous work period for the mobile autonomous machines at the worksite,
    when the continuous work period is in a first period of time of said different periods of time, control each of the mobile autonomous machines at all times in a first noise-optimized mode according to a first plurality of different sets of defined machine operation parameters each previously identified to yield different sound characteristics no louder than a first maximum noise limit level of said maximum noise limit levels stored in the non-transitory computer-readable memory, each of the different sets of defined machine operation parameters of the first plurality corresponding to respective first operational tasks performed by the mobile autonomous machine, and
    when the continuous work period is in a second period of time that is non-overlapping with the first time period of said different periods of time, control each of the mobile autonomous machines at all times in a second noise-optimized mode according to a second plurality of different sets of defined machine operation parameters each previously identified to yield different sound characteristics no louder than a second maximum noise limit level of said maximum noise limit levels stored in the non-transitory computer-readable memory, each of the different sets of defined machine operation parameters of the second plurality corresponding to respective second operational tasks performed by the mobile autonomous machine,
    wherein, for each said mobile autonomous machine, maximum productivity and sound output levels in the first noise-optimized mode are greater than maximum productivity and sound output levels in the second noise-optimized mode.

2. The system according to claim 1, wherein the different periods of time for the worksite include different times of a day, different days of a week, and/or different days of a year.

3. The system according to claim 1, wherein the control circuitry is configured to
    control the mobile autonomous machines according to the first noise-optimized mode such that collective sound generated at any one time by all of the mobile autonomous machines never exceeds the first maximum noise limit level, and/or
    control the mobile autonomous machines according to the second noise-optimized mode such that collective sound generated at any one time by all of the mobile autonomous machines never exceeds the second maximum noise limit level.

4. The system according to claim 1, wherein at least a portion of the non-transitory computer-readable memory and/or at least a portion of the control circuitry are remote from the mobile autonomous machines, said at least the portion of the control circuitry that is remote being in operative communication with the mobile autonomous machines to perform the setting and/or the controlling via a wireless communication network.

5. The system according to claim 1, wherein the non-transitory computer-readable memory and/or the control circuitry are/is distributed among the mobile autonomous machines at the worksite.

6. The system according to claim 1, wherein the maximum productivity of each of the mobile autonomous machines in the first noise-optimized mode and the maximum productivity of each of the autonomous machines in the second noise-optimized mode are greater than a maximum productivity of an operator-controlled mode of the mobile autonomous machine.

7. The system according to claim 1, wherein one of the operational tasks performed by the mobile autonomous machine in the second noise-optimized mode involves a different movement pattern compared to a corresponding one of the operational tasks performed by the mobile autonomous machine in the first noise-optimized mode.

8. The system according to claim 7, wherein the different movement pattern includes a re-sequencing of operations to perform said one of the operational tasks in the second noise-optimized mode.

9. The system according to claim 7, wherein the different movement pattern includes a different rate of moving a working tool of the autonomous machine to perform said one of the operational tasks in the second noise-optimized mode.

10. A method for enforcing noise level limits at a worksite comprising:
    accessing, in electronic memory, time-specific maximum noise limit data specific to the worksite, the time-specific maximum noise limit data including maximum noise limit levels for different periods of time for the worksite;
    providing, using one or more electronic processors, control signaling to control a plurality of autonomous working machines at the worksite during a continuous work period; and
    in response to said providing the control signaling, and depending upon whether in a first period of time or a second period of said different periods of time, either
    controlling each of the autonomous working machines in a first noise-optimized mode according to first defined machine operation parameters previously identified to yield different sound characteristics no louder than a first maximum noise limit level of said maximum noise limit levels, or controlling each of the autonomous working machines in a second noise-optimized mode according to second defined machine operation parameters previously identified to yield different sound characteristics no louder than a second maximum noise limit level of said maximum noise limit levels, wherein, for each said autonomous working machine, maximum productivity and sound output levels in the first noise-optimized mode are greater than maximum productivity and sound output levels in the second noise-optimized mode.

11. The method according to claim 10,
wherein the first defined machine operation parameters correspond to one or more tasks of the autonomous working machines in the first noise-optimized mode, and wherein the second defined machine operation parameters correspond to one or more tasks of the autonomous working machines in the second noise-optimized mode.

12. The method according to claim 10, further comprising:
controlling the autonomous working machines according to the first noise-optimized mode such that collective sound generated at any one time by all of the autonomous working machines never exceeds the first maximum noise limit level, and/or controlling the autonomous working machines according to the second noise-optimized mode for each of the autonomous working machines such that collective sound generated at any one time by all of the autonomous working machines never exceeds the second maximum noise limit level.

13. The method according to claim 12,
wherein said controlling the autonomous working machines according to the first noise-optimized mode such that collective sound generated at any one time by all of the autonomous working machines never exceeds the first maximum noise limit level includes performing respective tasks of the autonomous working machines in non-overlapping fashion in terms of timing, and/or wherein said controlling the autonomous working machines according to the second noise-optimized mode such that the collective sound generated at any one time by all of the autonomous working machines never exceeds the second maximum noise limit level includes performing respective tasks of the autonomous working machines in non-overlapping fashion in terms of timing.

14. The method according to claim 10, further comprising:
detecting sound generated from each of the one or more autonomous working machines for said controlling each of the autonomous working machines in the first noise-optimized mode or the second noise-optimized mode; and incrementally modifying the first or the second defined machine operation parameters to decrease, increase, or maintain sound generated by each of the one or more autonomous working machines.

\* \* \* \* \*